April 14, 1959   J. C. CUNNINGHAM   2,882,412
APPARATUS FOR TREATING PLASTIC MATERIAL
Filed June 3, 1953   3 Sheets-Sheet 2
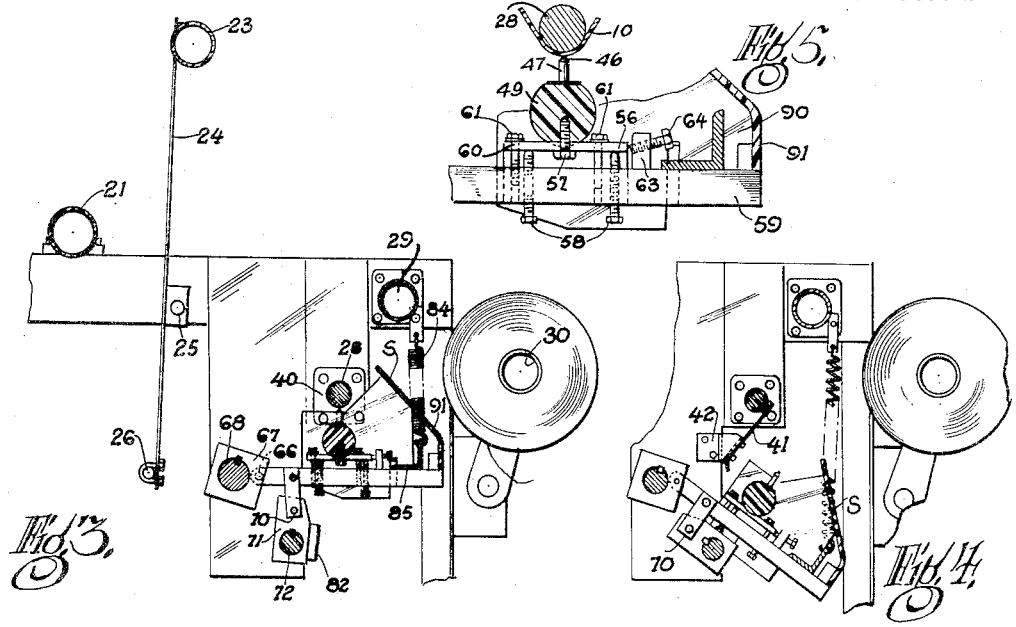
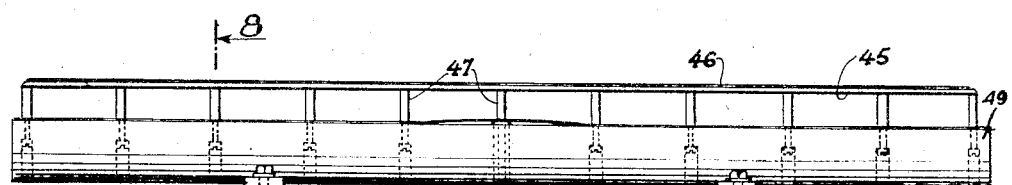
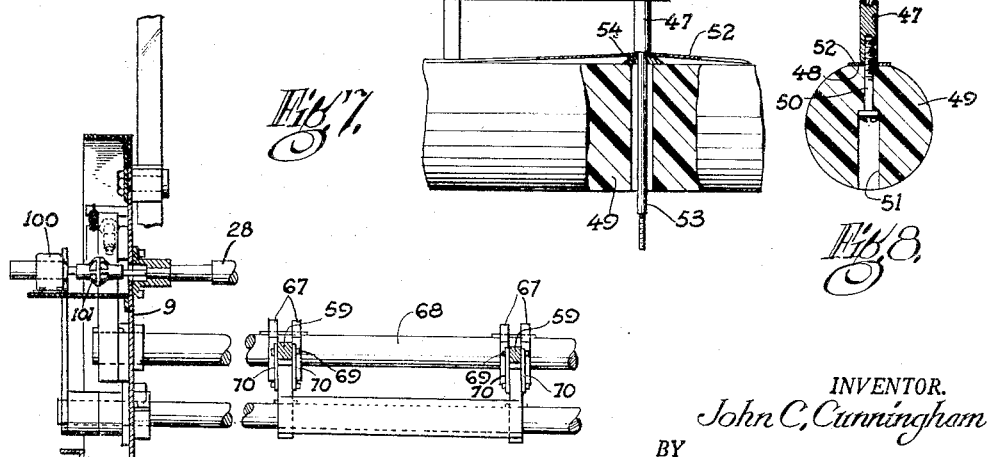
INVENTOR.
John C. Cunningham
BY
Pennie, Edmonds, Morton, Barrows & Taylor
ATTORNEYS

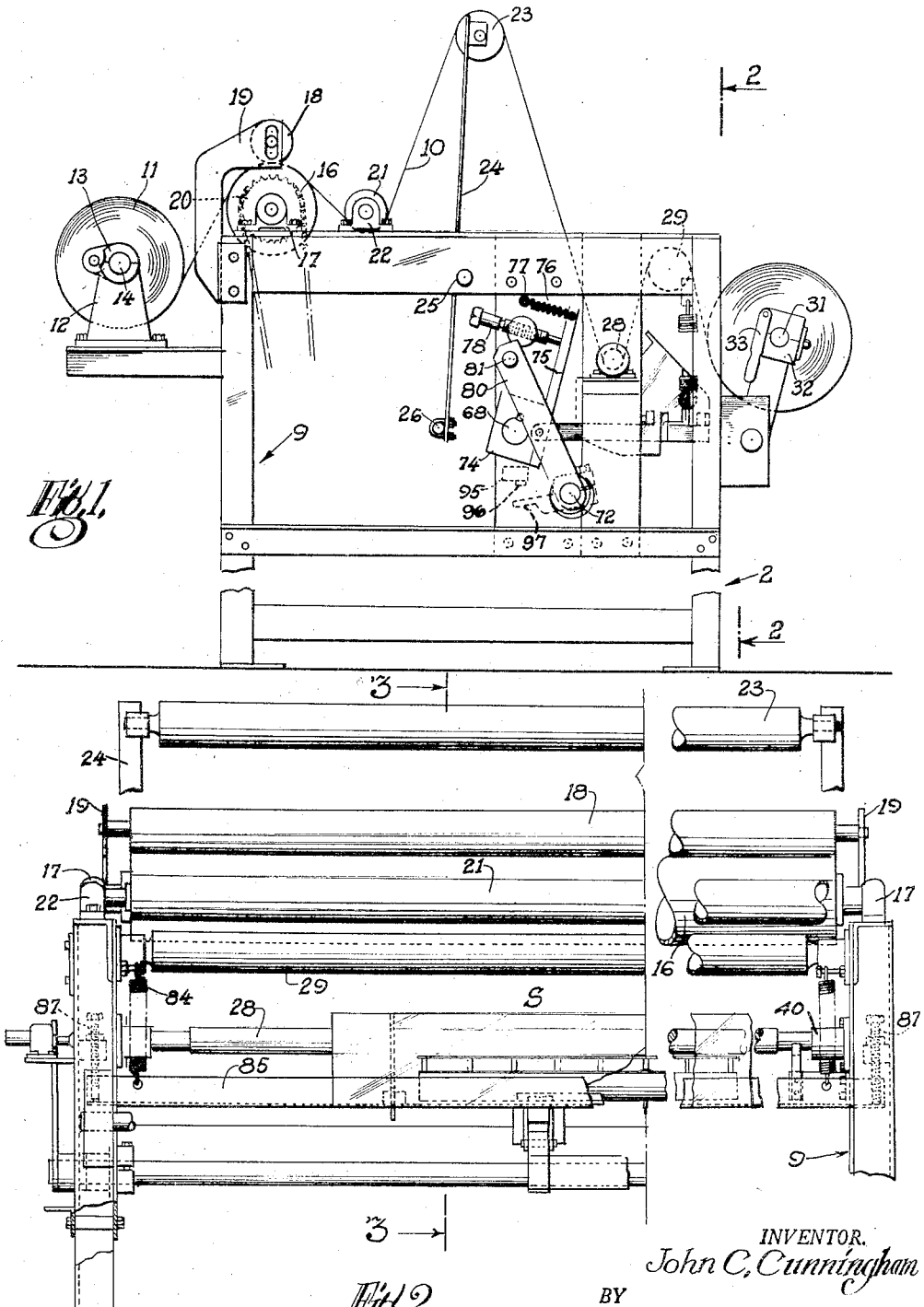

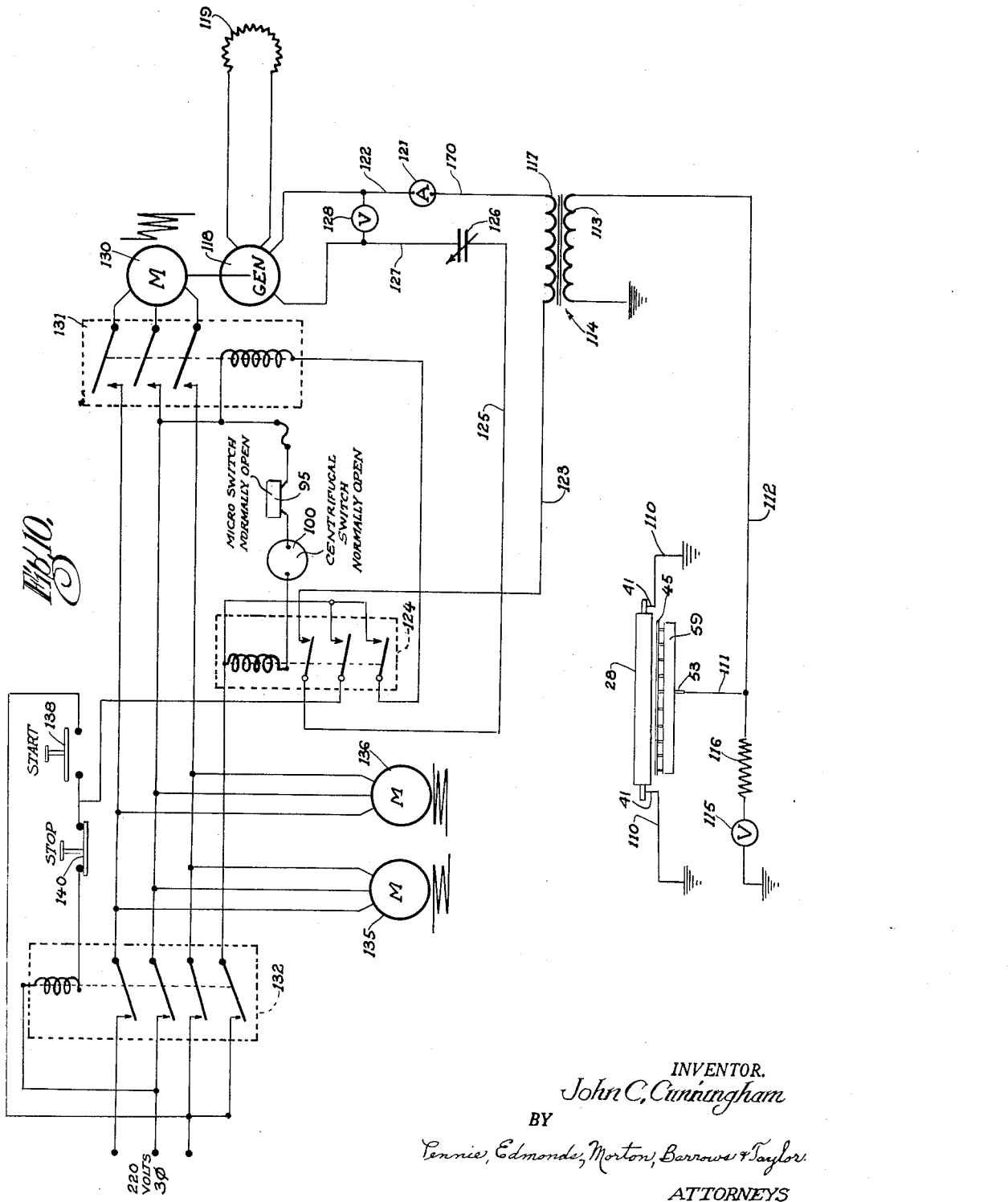

United States Patent Office 2,882,412
Patented Apr. 14, 1959

2,882,412

APPARATUS FOR TREATING PLASTIC MATERIAL

John C. Cunningham, New Haven, Conn., assignor to Olin Mathieson Chemical Corporation, a corporation of Virginia Application June 3, 1953, Serial No. 359,351

14 Claims. (Cl. 250—49.5)

This invention relates to an apparatus for treating plastic materials in sheet or film form, and particularly to such an apparatus through which continuous lengths of sheet material or film may be continuously passed for treatment. More particularly the invention is concerned with an apparatus for treatment of continuous lengths of plastic material in sheet or film form in accordance with the method set forth in copending application Serial No. 359,352, filed June 3, 1953, assigned to the assignee of the present application.

As pointed out in application Serial No. 359,352, considerable difficulty has been encountered in coating the surfaces of certain plastic materials, particularly polyethylene, because of the inherent non-adherability of those surfaces. In that application there is disclosed a method for treating the surfaces of polyethylene, particularly in sheet or film form, whereby the anchorage or adherence characteristics of such surfaces are greatly improved and inks and various other coatings that would rub, peel or scrape off such surfaces when untreated may be tightly adhered thereto. The method disclosed in the copending application involves the subjection of the polyethylene surfaces to be treated to a high frequency, high voltage corona or glow discharge. The discharge is preferably established from a relatively narrow or knife-edged electrode and the surface to be treated passed through the discharge transversely of the electrode and spaced therefrom. When the polyethylene structure to be treated is of sheet or film form it may be passed through the field of discharge firmly in contact with the surface of a grounded roll, the axis of which extends lengthwise of the electrode. The apparatus of this invention is one by which the method of the copending application as applied to polyethylene in sheet or film form may be satisfactorily carried out.

Broadly the present invention contemplates the provision of a suitable framework for supporting a grounded member and means for passing a quantity of polyethylene sheet or film to be treated from a source of material in untreated form over the grounded member where it is treated, to a wind-up mechanism where the treated material is wound into rolls. Means are also provided for regulating the speed of travel of the material and for maintaining it under suitable tension throughout its travel. The framework also supports an electrode support assembly by which a knife-edged electrode may be moved into and out of operative relation to the grounded member and with respect to the path of travel of the material through the apparatus. As high frequency and high voltages are to be employed, suitable provision is made for the safety of the operator, including means for shielding the electrode from access by the operator when in operative position and means preventing energization of the electrode when in inoperative position. Means is also provided for adjustment of the operative position of the electrode relative to the grounded rolls.

For a more detailed understanding of the invention, reference may be had to the following description of one form of apparatus according to the invention taken in connection with the illustrations thereof in the accompanying drawings in which:

Fig. 1 is a side elevation of the apparatus;

Fig. 2 is a front elevation of the apparatus of Fig. 1 taken substantially along line 2—2 of Fig. 1;

Fig. 3 is a sectional view in elevation taken along line 3—3 of Fig. 2 illustrating the electrode in operative position;

Fig. 4 is a sectional view similar to Fig. 3 showing the electrode in inoperative position;

Fig. 5 is an enlarged sectional view showing in more detail the manner in which the electrode is mounted;

Fig. 6 is a front elevation of the electrode;

Fig. 7 is an enlarged view, partly in section, of the central portion of the electrode;

Fig. 8 is a cross sectional view of the electrode taken along line 8—8 of Fig. 6;

Fig. 9 is a fragmentary sectional view in elevation illustrating certain of the controls for movement of the electrode and for the energization and deenergization of the electrode; and Fig. 10 is a diagrammatic view of the electrical circuits of the apparatus.

Referring to the drawings, and particularly to Figs. 1 and 2 thereof, the apparatus is mounted on a rigid framework 9. The sheet material or film to be treated is provided in the form of a web 10, a roll thereof 11 being removably mounted between a pair of stanchions 12 having clamp-like bearings 13 to receive a supporting mandrel 14 which extends through an open core of the roll 11. A driving roll 16 mounted in bearings 17 secured to the frame 9 draws the web 10 from the supply roll 11. An idler pressure roll 18 confined to limited free vertical movement by brackets 19 rides on the drive roll 16 and serves to maintain the web 10 in driving contact therewith. The drive roll 16 is driven by means of a chain drive 20 from a drive motor, not shown. The web 10 then is passed beneath an idler roll 21 journaled for free rotation in bearings 22 secured to the framework. The web next passes over a freely rotatable tension roll 23 carried on one end of a tension bar 24 which is pivotally secured to a shaft 25 mounted in the frame 9 and carries at its opposite end a counterweight 26. This tensioning apparatus, in combination with a wind-up arbor to be hereinafter described, maintains the web under continuous uniform tension as it passes through the apparatus and additionally provides a visual indication of whether or not the hereinafter described wind-up apparatus is operating at a proper speed. From the tension roll 23 the web 10 is passed downwardly beneath and around a grounded roll 28 (also hereinafter more fully described) and thence over an idler roll 29 suitably mounted on the frame 9, to a wind-up arbor where it is wound upon a core 30 (Fig. 3) which is removably mounted on a mandrel 31 (Fig. 1) which in turn is removably secured in a split journal bearing 32 having an opening, closing and locking handle 33. The mandrel 31 is driven through a suitable variable speed drive (not shown) by a motor (not shown).

The grounded roll 28 is mounted for free rotation in bearings 40 suitably secured to the frame and advantageously is a 1½ inch diameter chrome-plated steel roll adapted to be rotated by the sheet material or film 10 passing in contact with its surface. A pair of carbon brushes 41, one at each end of the roll (one being shown in Fig. 4), are secured to the frame 9 by brackets 42, which brushes, by constant electrical contact with the grounded roll 28 and with the frame serve to maintain the roll at ground potential.

In Figs. 6 to 8, there is illustrated an electrode, the discharge from which to the grounded roll 28 across the web 10 is adapted to treat the material in the manner fully set forth in the aforementioned copending application Serial No. 359,352. As shown, the electrode comprises a long brass bar 45 having a substantially triangular cross sectional shape. The peak of the brass bar is truncated and a small tungsten wire 46 of comparable length is securely fixed in a recess in the truncated surface. The electrode is supported by a plurality of spaced brass studs 47 secured to a flattened surface 48 of a Lucite rod 49 by bolts 50 located in openings 51 which pass through the Lucite rod, the heads of the bolts 50 being countersunk substantially into the rod. A flat brass strip 52 extends lengthwise of the Lucite rod in contact with the flattened surface 48 thereof and with the bottoms of the brass studs 47. This brass strip electrically connects the rear ends of the studs, but is not essential to proper operation of the electrode. Current may be supplied to the electrode through a brass rod 53 which passes completely through the Lucite rod 49 and is integral with the central brass stud 47. It also contacts the brass strip 52. A crowned button 54 is inserted under the central strip 52 to provide support for stud 47 and rod 53.

The electrode assembly, including the Lucite rod 49, is secured to a pair of angle members 56 (Fig. 6) by a pair of bolts 57, one of which is shown in Fig. 5. Each of the angle members 56 is in turn adjustably supported on the upper ends of a pair of adjustment set screws 58 mounted in a support member 59. Each angle member is further provided with a pair of slots 60 through which extend a pair of bolts 61 threadedly received in support member 59. The position of each angle member 56 and hence the position of the electrode assembly may be adjusted by sliding the members backward or forward on the set screws 58 to a variety of different positions in which it may be fixed by the bolts 61. A cross bar 63 extending transversely across and secured to support members 59 carries a pair of adjusting screws 64 for adjustment of the position of the angle members 56. Adjustment of the electrode assembly is of course desirable in order that its position relative to grounded roll 28 may be properly adjusted.

The electrode support members 59 are pivotally supported at their adjacent inner ends by pivot pins 66 mounted between pairs of plates 67 (Figs. 3 and 9) keyed to a shaft 68 supported by the frame 9. Each support member 59 is further supported on a pivot pin 69 extending between a pair of links 70 which are pivotally connected to plates 71 keyed to a second support shaft 72 mounted on the frame. The pins 66 are adjustable, fixed pivots, the electrode support members being adapted to normally pivot about these pins in a predetermined position. The pivot points may be adjusted by rotative adjustment of the shaft 68. At its outer end (Fig. 1) shaft 68 carries a plate 74 keyed to it. An adjusting arm 75 fixedly secured to plate 74 extends upwardly therefrom and has secured to its outer end one end of a spring 76, the other end of which engages fixed pin 77 on the frame 9. An adjustment screw 78 is also mounted on the frame and is adapted to engage adjusting arm 75, urging it outwardly against the tension of spring 76. By means of adjustment screw 78 shaft 68 may be adjustably turned to variably adjust the positions of the pivot pins 66 about which the electrode support arms 59 are pivoted.

Pivotal movement of support arms 59 from their operative electrode advancing position, as shown in Figure 3, to their inoperative electrode retracting position, shown in Fig. 4, is accomplished by turning shaft 72 in a counterclockwise direction as viewed in Fig. 3. To provide for such turning of the shaft 72, a crank arm 80 (Fig. 1) having a handle 81 is mounted on the outer end of the shaft. Rotation of crank arm 80 to turn shaft 72 in counterclockwise direction moves plate 71, fixed to the shaft 72 in a counterclockwise direction, thereby drawing links 70 downwardly to the left as seen in Figs. 3 and 4. These in turn pull electrode support members 59 downwardly, pivoting them about pins 66 to inoperative electrode retracting position as illustrated in Fig. 4. Plates 71 carry abutting members 82 which engage the faces of support members 59 limiting the downward travel of the electrode support. Counterbalance springs 84, the upper ends of which are secured to the frame 9 and the lower ends of which are secured to an angle iron 85 extending across and secured to support members 59, provide for floating movement of the electrode support. Upward movement of the electrode support in response to the action of springs 84 and clockwise rotation of shaft 72 by crank 80 is limited by a pair of bolts 87 adjustably mounted in the frame 9 and adapted to engage laterally extending angle iron 85 (Fig. 2).

A Plexiglas shield S having side walls 90 and a rearwardly extending front wall 91 (Figs. 3, 4 and 5) is mounted on support members 59 and extends completely across the apparatus to enclose the ends and front of the electrode when in operative position and thereby preventing access thereto in this position. When the electrode is at inoperative position, as illustrated in Fig. 4, access may be had to the electrode over the upper edge of the front wall 91 of the shield S. As indicated previously in this description and as fully explained in the aforementioned copending application, the voltages to be employed in this apparatus for the treatment of plastic sheet material are relatively high. Hence, in addition to providing a shield to prevent access to the electrode when in operative position, provision must also be made to assure that the electrode is not energized when in inoperative position. Additionally, for reasons that will be explained hereinafter, it is desirable to assure that the electrode will not be energized while the web 10 is stationary in the apparatus. Also, under certain conditions it is desirable that the electrode be de-energized when there is no sheet material in the apparatus. The apparatus provided to assure that the electrode is de-energized under the above conditions will now be described.

To prevent energization of the electrode when in inoperative position, a normally open microswitch 95 (Fig. 1) is provided in the electrode circuit. The actuating member 96 of the switch 95 is engaged by an arm 97, clamped to shaft 72, when said shaft is rotated in a clockwise direction to move the electrode into operative position. When the shaft 72 is moved in the opposite direction to retract the electrode to inoperative position, the arm 97 is disengaged from the actuating member 96 of the switch 95 and the switch opens. A normally open centrifugal switch 100 (Fig. 9) is also contained in the electrode circuit. The operating shaft of the centrifugal switch which is mounted on the frame 9 is connected by a ceramic insulating coupling 101 to the grounded roll 28. When the web 10 moves and rotates the grounded roll 28, the centrifugal switch 100 closes and energization of the electrode is permitted. As previously indicated, the grounded roll is mounted for free rotation and is rotated solely by the web of sheet material passing through the apparatus. When the grounded roll ceases to rotate, either because the web 10 is stationary in the apparatus or there is no web in the apparatus, the centrifugal switch 100 opens and the electrode may no longer be energized.

In operation of the apparatus, the web 10 of sheet material to be treated is subjected, as it passes over the grounded roll 28, to a glow or corona discharge from the electrode established by applying a potential between the electrode and the grounded roll across the material, the potential being on the order of from 3,000 to 22,000 volts at a frequency of from 500 to 17,500 cycles per second. Such potential is sufficient to establish a corona discharge in the space between the electrode and the sheet material which is in contact with the grounded roll. In order to prevent arcing, which may severely damage the material of the web 10, it has frequently been found desirable to provide the grounded roll 28 with a covering of dielectric material. I have found the dielectric material most suitable for this purpose to be thin sheet of "Mylar" plastic (polyethylene terephthalate). Even this material, however, deteriorates under constant operation at the voltages employed, and it has been found that the covering must be replaced after every eight to twelve hours of operation. If the web 10 to be treated is of lesser width than the electrode so that a portion of the dielectric covering of the grounded roll 28 is exposed directly to the electrode, that portion of the dielectric covering will rapidly deteriorate. To prevent rapid deterioration thereof, the exposed portions of the dielectric covering on the grounded roll 28 are covered with a further layer of insulating material. It has been found that two layers of glass cloth in addition to a .001 inch sheet of "Mylar" film will provide good protection when wrapped about the exposed portions of the covering.

In certain instances it has been found that no dielectric covering of the grounded roll 28 is necessary. In these instances, however, when the sheet material to be treated is of lesser width than the width of the electrode, the exposed portions of the grounded roll 28 opposite the electrode must be covered to prevent arcing, which would result of course in a failure of the treatment, for no glow discharge would be formed.

Further to prevent damage of the web of sheet material 10 being treated, it is preferred, as previously mentioned, that the sheet material be maintained in firm contact throughout its width with the grounded roll 28. The tensioning roll 23 accomplishes this in conjunction with proper operation of the wind-up arbor which forms the roll of treated material. As the roll of treated web of material seen in Figs. 1, 3, and 4 becomes larger in diameter, it will be clear of course that the speed of rotation of that roll will have to be decreased, because drive roll 16, which draws the web into the apparatus, is run at substantially constant speed. The position of tension arm 24 gives a good visual indication of when the wind-up is proceeding too rapidly, as the arm will then turn in a clockwise direction from its normal substantially vertical position. When this happens the speed of the wind-up roll is decreased through a suitable variable speed drive therefor.

Turning to Fig. 10, the electrical power supply for forming the glow discharge from the electrode will be described. The grounded roll 28 is connected through the carbon brushes 41 and a ground wire 110 to ground. The electrode is connected through conductor rod 53 and line conductors 111 and 112 to one terminal at the secondary 113 of a high voltage transformer 114, the other terminal of which is grounded. A discharge voltmeter 115 grounded through a fixed resistance 116 is also connected to the secondary of the transformer through lead 112.

The primary 117 of the transformer 114 is provided with alternating current from a generator 118, the output of which may be varied by means of a field rheostat 119. One terminal of the transformer primary is connected to the generator through a conductor 170, an ammeter 121 and conductor 122. The other terminal of the primary is connected to the generator by a conductor 123, normally open relay 124, conductor 125, a capacitor 126 and conductor 127. A voltmeter 128 is connected across the conductors 122 and 127. The insertion of the capacitor 126 in the primary circuit permits tuning thereof to reduce the voltage drop between the primary 117 of the transformer and the generator.

The generator 118 is driven by a three-phase motor 130 connected to a 220 volt power source through normally open relays 131 and 132. A pair of three-phase motors 135 and 136 for driving, respectively, drive roll 16 of the apparatus and the wind-up arbor are also connected to the 220 volt power source through normally opened relay 132.

The coil of relay 132 is energized by pressing a start button 138 which closes an auxiliary circuit, including the coil, across two lines of the power source. The closing of relay 132 effects energization of the coils of relays 124 and 131, thereby closing these relays, providing the microswitch 95 and normally open centrifugal switch 100 are closed, indicating respectively that the electrode is in operative position and that the grounded roll 28 is being rotated by the passage of sheet material in contact therewith. Closing of the normally open relay 131 energizes the generator-driving motor 130 while closing of relay 124, in addition to completing the circuit through the coil of relay 131, completes the circuit of the primary 117 of the transformer 114. The third pair of contacts of relay 124 maintains a holding circuit through the coil of relay 132 so that the start button may return to inoperative position. In order to deenergize the circuits, stop button 140 may be depressed thereby deenergizing the coil of relay 132. This, among other things, deenergizes relay 124 whereby, when the stop button returns to its normally closed position, the system is not reactivated.

Various changes and modifications may of course be made in the particular apparatus illustrated and described without departing from the scope of my invention. Hence my invention should be limited only to the extent set forth in the appended claims.

I claim:

1. Apparatus for treating plastic sheet material comprising a freely rotatable grounded roll, means connecting said grounded roll to ground, means for passing a web of said sheet material over and in contact with said grounded roll, said grounded roll being rotated by contact with the moving sheet material, a narrow electrode of substantial length spaced from said grounded roll opposite that surface portion thereof which is engaged by said sheet material whereby the web of sheet material in passing over the grounded roll is spaced from the electrode, said electrode extending substantially lengthwise of said grounded roll and parallel thereto, means for connecting said electrode to a source of high frequency, high voltage current, said last-mentioned means including a normally open switch closed by rotation of said grounded roll.

2. Apparatus for treating plastic sheet material comprising a freely rotatable grounded roll, means continuously connecting said grounded roll to ground, means for passing a web of said sheet material over and in contact with said grounded roll, said grounded roll being rotated by contact with the moving sheet material, an electrode spaced from said grounded roll opposite the surface portion thereof engaged by the web of sheet material whereby said web in passing over the grounded roll passes between it and the electrode, means supporting said electrode for movement into and out of operating position relative to said grounded roll, a source of high frequency, high voltage current, and means for connecting said source to said electrode, said last-mentioned means including a normally open switch closed by rotation of said grounded roll.

3. Apparatus according to claim 2 in which the means for connecting the voltage source to the electrode also includes a switch operated by movement of said electrode supporting means, said switch being opened by said electrode supporting means when the latter is moved to move the electrode out of operating position relative to the grounded roll.

4. Apparatus according to claim 3 which includes means maintaining said web of sheet material under a controlled tension during passage through said apparatus, and in which the electrode is a narrow substantially knife-edged electrode extending longitudinally of said grounded roll and parallel thereto.

5. Apparatus for treating sheet material comprising a grounded member, an electrode spaced from said grounded member, means for passing a web of sheet material between said grounded member and said electrode, means supporting said electrode for movement into and out of operating position relative to said grounded member, a source of high frequency high voltage current, and means for connecting said source to said electrode, said last-mentioned means including a switch operated by movement of said electrode supporting means, said switch being opened by said electrode supporting means when the latter is moved to move the electrode out of operating position relative to the grounded member.

6. Apparatus according to claim 5 which includes means for maintaining said web of sheet material under a controlled tension at least during the portion of its travel through the apparatus during which it passes between said grounded member and said electrode.

7. Apparatus according to claim 6 in which the electrode supporting means includes means for adjustably mounting the electrode thereon whereby the operative and inoperative positions of the electrode relative to said grounded member may be varied.

8. Apparatus for treating sheet material comprising a grounded member, an electrode spaced from said grounded member, means for passing a web of sheet material between said grounded member and said electrode, means supporting said electrode for movement into and out of operating position relative to said grounded member, means for connecting said electrode to a source of high frequency, high voltage current, said last mentioned means including a switch operated by movement of said electrode-supporting means, said switch being opened by said electrode-supporting means when the latter is moved to move the electrode out of operating position relative to the grounded member, and a shield supported and movable by said electrode-supporting means, said shield extending throughout the length of the electrode and being positioned by said electrode-supporting means to prevent access to the electrode when the electrode is supported by the supporting means in operative position and moved, when said electrode-supporting means is moved to place the electrode in inoperative position, to a position permitting access to the electrode.

9. Apparatus according to claim 8 in which the shield is made of transparent material.

10. Apparatus for treating plastic sheet material comprising a grounded roll, means for passing a web of said sheet material over and in contact with said grounded roll and a narrow electrode of substantial length spaced from said grounded roll opposite that surface portion thereof which is engaged by said sheet material whereby the web of sheet material in passing over the grounded roll is spaced from the electrode, said electrode extending substantially lengthwise of said grounded roll and parallel thereto and comprising a support of insulating material, a bar conductor supported thereby, and a wire conductor secured to a face of said bar conductor on the side of said bar remote from said support, said support, bar conductor and wire conductor each extending lengthwise of said grounded roll and substantially parallel thereto.

11. Apparatus according to claim 10 in which the bar conductor has a truncated triangular cross section, the truncated face of said bar conductor being on the side thereof remote from the insulating support and facing said grounded roll, and in which the wire conductor is embedded and secured in a recess formed in the truncated face of the bar conductor.

12. Apparatus for treating plastic sheet material comprising a grounded roll, an electrode spaced from said grounded roll, means for passing a web of said sheet material over said grounded roll between it and the electrode, a transformer the primary of which is connected in a circuit with a generator the secondary being connected in a circuit with said electrode, a rheostat for adjusting the field of said generator to vary the voltage in said primary circuit, and means in series with said generator in the primary circuit for varying the current therein.

13. Apparatus according to claim 12 in which the last-mentioned means is a variable condenser.

14. Apparatus for treating plastic sheet material comprising a grounded roll, an electrode spaced from said grounded roll, means for passing a web of said sheet material over said grounded roll between it and the electrode, a transformer the primary of which is connected in a circuit with a current source the secondary being connected in a circuit with said electrode, means for varying the voltage in said primary circuit, and a variable condenser in series with the primary of said transformer for varying the current in said primary circuit.

References Cited in the file of this patent

UNITED STATES PATENTS

| | | |
|---|---|---|
| 689,615 | Heyl-Dia | Dec. 24, 1901 |
| 1,716,151 | Robinson et al. | June 7, 1929 |
| 1,882,578 | Hardiman | Oct. 11, 1932 |
| 1,964,241 | Bedell | June 26, 1934 |
| 2,043,217 | Yaglou | June 2, 1936 |
| 2,231,917 | Jones | Feb. 18, 1941 |
| 2,240,914 | Schutze | May 6, 1941 |
| 2,319,174 | Wilson | May 11, 1943 |
| 2,466,967 | Pressel et al. | Apr. 12, 1949 |
| 2,506,080 | Gross | May 2, 1950 |
| 2,545,354 | Hansen | Mar. 13, 1951 |
| 2,558,900 | Hooper | July 3, 1951 |
| 2,576,047 | Schaffert | Nov. 20, 1951 |
| 2,588,675 | Walkup et al. | Mar. 11, 1952 |
| 2,676,100 | Huebner | Apr. 20, 1954 |
| 2,701,764 | Carlson | Feb. 8, 1955 |
| 2,732,775 | Young | Jan. 31, 1956 |

FOREIGN PATENTS

| | | |
|---|---|---|
| 510,068 | Belgium | Apr. 25, 1952 |